United States Patent

Yung et al.

[11] Patent Number: 5,826,495
[45] Date of Patent: Oct. 27, 1998

[54] BREADMAKER

[75] Inventors: Jimmy Siu Yim Yung; John Duncan McNair, both of Hong Kong, Hong Kong

[73] Assignee: Chiaphua Industries Limited, New Territories, Hong Kong

[21] Appl. No.: 805,369

[22] Filed: Feb. 24, 1997

[51] Int. Cl.[6] .............................. A21B 1/00; A21D 8/00; A47J 27/00; A47J 37/01
[52] U.S. Cl. .............................. 99/348; 99/331; 366/98; 366/146; 366/314
[58] Field of Search .............................. 99/339, 348, 404, 99/405, 410, 412, 415, 476, 477, 326–334; 366/98, 314, 601, 144–146; 219/400; 126/21 A

[56] References Cited

U.S. PATENT DOCUMENTS

| | | | |
|---|---|---|---|
| 4,984,512 | 1/1991 | Takahashi et al. | 99/327 |
| 5,351,606 | 10/1994 | Matsuzaki | 99/348 |
| 5,410,949 | 5/1995 | Yung | 366/146 X |
| 5,433,139 | 7/1995 | Kitagawa et al. | 99/327 |
| 5,590,583 | 1/1997 | Harrison | 219/400 X |

*Primary Examiner*—Timothy F. Simone
*Attorney, Agent, or Firm*—Miller, Sisson, Chapman & Nash, P.C.

[57] ABSTRACT

A single loaf breadmaker has a container sealingly mounted to the top of a housing and an electric heating element is mounted to an outside surface. A paddle is mounted at the bottom of the container and driven in use by an electric motor. Because the container is sealed in place in the housing and because the heating of the container is direct, no foodstuff can enter the housing and much less heat is wasted. Means are described for lifting the paddle at the end of backing to aid removal of each cooked bread loaf.

8 Claims, 2 Drawing Sheets

BREADMAKER

BACKGROUND OF THE INVENTION

1. FIELD OF THE INVENTION

The invention relates to breadmakers.

2. DESCRIPTION OF PRIOR ART

There are already many electrical breadmakers available for making individual loaves of bread in the home. In each case the baking ingredients are normally placed in a bread pan or a container which is lowered into a compartment that is heated by an electrical element fitted in the compartment. The container includes a dough hook or paddle that can be mechanically coupled to a motor mounted below the container in the compartment. A bread making cycle usually includes a first mixing and kneading phase, an interval to allow the bread mix to rise, a second kneading phase and a second interval for a second rise, and finally a baking phase. Once the bread is baked the finished loaf and usually the container are removed from the compartment.

It is possible that some bread making ingredients are spilled outside the container and fall inside the compartment requiring especial care when loading the container and/or difficulty in keeping the compartment clean. Spilled ingredients can become baked onto the surfaces of the compartment and difficult to remove. The heating of the container is also indirect, leading to inherent loss of heat, and indeed often general heating of the external surfaces of the breadmaker.

SUMMARY OF THE INVENTION

It is an object of the invention to overcome or at least reduce these disadvantages.

According to the invention there is provided an electric breadmaker comprising a container for receiving bread mix which is sealingly mounted to a top of a housing, heating means arranged to heat the outer surface of the container for heating bread mix in the container, a paddle in the bottom of the container for connection to a mechanical drive that extends through a central aperture therein into the housing, and an electric motor arranged to be coupled to the mechanical drive for rotating the paddle.

The heating means may comprise an electric element surrounding the outside of the container in close proximity therewith. Preferably, the heating element is mounted adjacent a top surface of the container.

The breadmaker may have a lid that closes over the top of the housing and has a lower surface formed or heat conducting material to receive and transmit heat in use from the heating element generally downwards into the container.

Preferably, lifting means are provided for selectively raising a bread loaf to aid removal of a finished loaf of bread from the container.

The lifting means may comprise an air jet in a lower surface of the container.

The lifting means may be arranged to be applied to the paddle. The lifting means may comprise a mechanical lever arrangement manually operable from externally of the housing and arranged to apply an upward force to the paddle. Alternatively, the paddle may be coupled to the mechanical drive by a screw thread and lifting is achieved by driving the paddle in an opposite direction to its normal operating direction whereby unscrewing the paddle to cause the paddle to move upwards.

BRIEF DESCRIPTION OF THE DRAWINGS

A single loaf breadmaker according to the invention will now be described by way of example with reference to the accompanying schematic drawings in which.

DESCRIPTION OF THE PREFERRED EMBODIMENT

Figure 1:
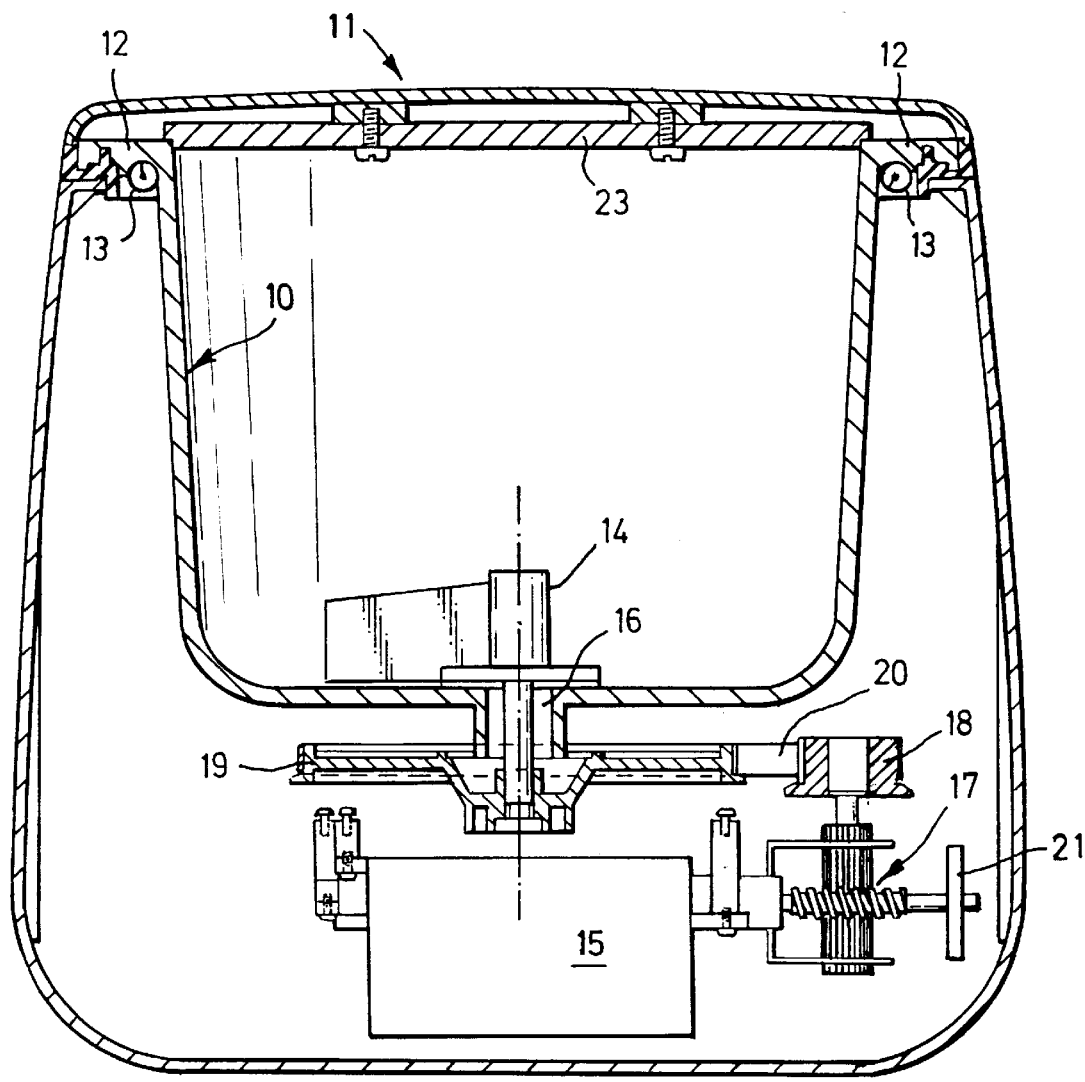
FIG. 1 is a sectional elevation of the breadmaker.

Referring to the drawings, in FIG. 1 a bread pan or container 10 sealing fits to in the top of a housing 11 and has at its upper surface a peripheral rim 12. An electric heating element 13 is bonded to the outer surface of the container 10, under the rim 12, so as to be positioned adjacent the top of the container and directly heat container in use.

Figure 2:
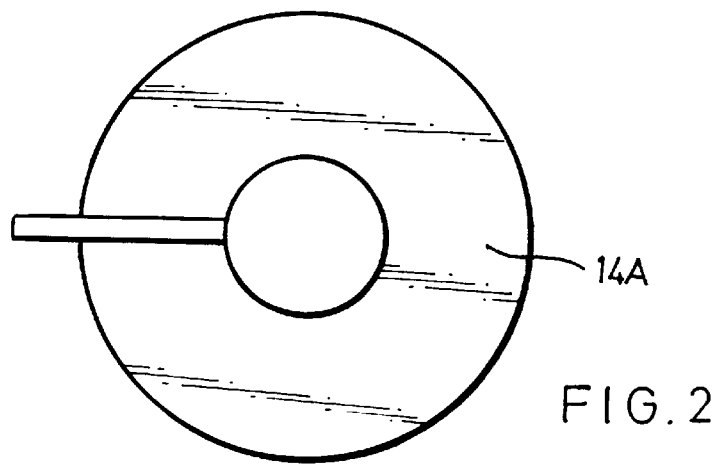
FIG. 2 is a top plan view of a paddle for the breadmaker.

A bread mixing and kneading paddle 14 (shown also in FIG. 2) is mounted in the bottom of the container 10. The base 14A has a relatively large surface area to facilitate removal of bread loaves as explained below. The paddle 14 is connected to a mechanical drive that extends through a central aperture for coupling to an electric motor 15 mounted inside the housing 11. The mechanical drive includes a liquid-tight shaft seal 16 below the paddle (especially so that the container 10 can also be used for cooking and mixing foodstuffs other than bread), a worm gear 17, two pulleys 18 and 19, and a drive belt 20. An auxiliary wheel 21 is mounted to rotate with the worm gear 17 in the described breadmaker which is accessible from externally of the housing 11. Generally with a suitable tool the wheel 21 can be manually rotated if the motor 15 stalls, but more particularly to rotate the worm gear in an opposite to normal rotational direction, if preferred without applying electric power, to lift the paddle 14 upwards, as will be explained below.

A lid 22 fits snugly to the top of the housing 11 and has an inner lower surface formed by a robust metal plate 23 that serves during the baking bread to conduct and direct heat from the element 13 downwards into the container 10. This is particularly helpful and ensures that the top of the loaf receives sufficient radiant heat to form a desirable top crust when the bread loaf is otherwise fully baked.

Figure 3:
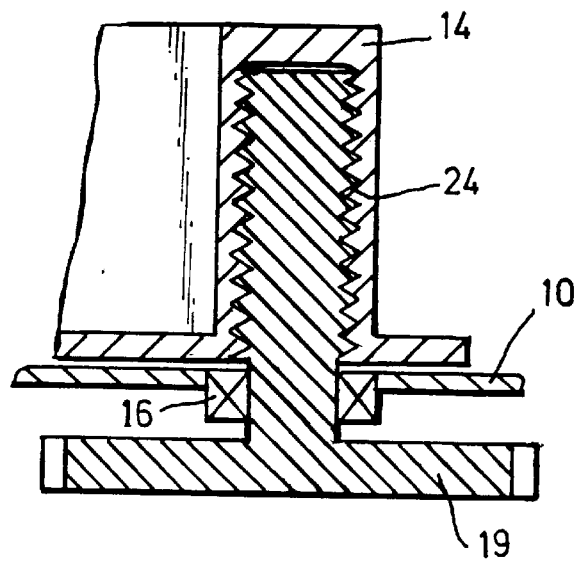
FIG. 3 is a sectional view of part of a mechanical drive for the paddle.

Normally the container 10 is permanently fixed and sealed to the housing 11. However, a suitable sealed arrangement can be achieved with the configuration generally as shown in FIG. 1 and enable removal of the container 10 upwards out of the housing. In that situation, the components including the mechanical drive and the motor 15 may be removed as a combined unit, or the parts be separated at the seal 16. The paddle is usually separately removable anyway especially to aid cleaning, and also in cases for cooking other foodstuffs and not required. In any event, where the container 10 is arranged to be removable (or indeed for ease of initial assembly), the electric element 13 may be connectable to its normal power supply by plug-and-socket connections. Such connections are suitably mounted so that they make and break as the container 10 is entered into or removed from the housing 11.

Where the container is permanently fixed to the housing, it is preferable to have means to aid the removal of a cooked bread loaf. This is carried out by lifting the bread loaf up; it is usually sufficient to raise the loaf only slightly to break the seal formed with the lower surface of the container 10. In one arrangement, the container 10 is provided with a number of very small apertures along and near its lower surface and using a manually operated hand pump or bellows blowing air through the apertures when required. Such an arrangement may not be wholly satisfactory in all circumstances, especially if the container 10 is required for use in cooking or mixing other foodstuffs and therefore other lifting aid arrangements may be used. One such other arrangement is illustrated in FIG. 3. The paddle 14 is connected to the mechanical drive by a screw thread 24. It will be noted of course that the paddle 14 can therefore be readily removable for cleaning as already mentioned above. During normal mixing and kneading the paddle is driven in a clockwise direction and the paddle therefore remain tightened to the mechanical drive. At the end of baking, the mechanical drive is rotated anti-clockwise whereupon the paddle, being held stationary by the cooked loaf, unscrews along the thread 24. As a result, the paddle 14 is lifted upwards to raise the loaf away from the lower surface of the container 10. The anti-clockwise rotation can be achieved by reversing the motor 15, or manually by turning the wheel 21 as mentioned earlier.

Figure 4:
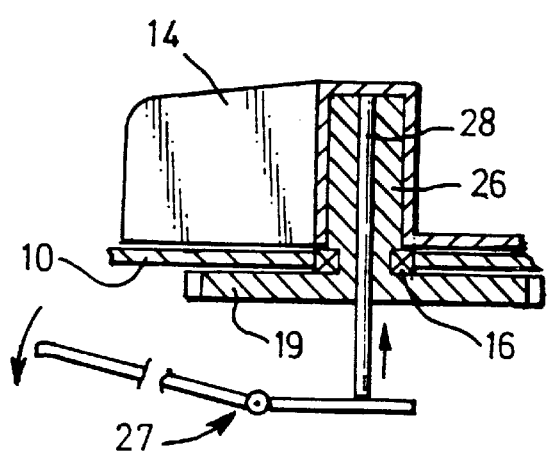
FIG. 4 is a sectional plan view of part of a level lifting arrangement for the paddle.

In another arrangement, see FIG. 4, the paddle 14 is slidable onto and keyed to a mechanical drive shaft 26. The paddle can therefore be lifted by a lever arrangement 27, a remote end of the lever being exposed externally of the housing 11. The drive shaft 26 is hollow and a lifting rod 28 is slidably mounted inside the shaft 26. When the lever arrangement is operated, the rod 28 pushes the paddle 14 upwards as required.

It is also possible to have a mechanical lifting arrangement that lifts the whole sub-assembly, including the drive pulleys and motor 15, upwards so as to raise the paddle 14 as required.

It will be noted that the bread pan or container 10, whether removable or not, is sealingly attached to the top of the housing 11. As a result it is impossible for any foodstuff or ingredients to enter inside the housing 11. Further, the heating element 13 is disposed and positioned to heat the container 10 directly. Heat losses are therefore minimised, as compared to prior art breadmakers, and the outside surfaces of the housing 11 are much less prone or likely to become dangerously or uncomfortably hot during use. It is quite normal to provide temperature sensors in breadmaker and control circuits to turn the heating elements ON and OFF as required in well-known manner. In the described arrangement however, any temperature sensors can be more accurately disposed to measure actual temperatures of the foodstuff and be generally safely insensitive to the temperature of the heating elements themselves. Further, the direct mounting of the heating elements against and to the outer surface of the container 10 provides simplicity in manufacturing and robust support for such elements once mounted.

In prior art breadmakers, it is normally a requirement to include some kind of a clutch in the mechanical drive. No clutch is necessary in embodiments of the present invention.

It will be appreciated that whereas the container 10 has been described as preferably having a heating element mounted adjacent the top of the container, the element 13 may be fitted lower down and/or additional heating elements fitted intermediate the height of the container 10. It is also possible using the described breadmaker to heat the outside surfaces of the container 10 using radiant heat or hot air.

Embodiments of the invention incorporate electrical programme controllers to provide appropriate cycling of the operations of the paddles 14 and the heating elements 13 and also normal safety cut-outs in manners known per se. Such aspects of the breadmaker have therefore not been described in full, as they form no part of the present invention.

We claim:

1. An electric breadmaker comprising a container for receiving bread mix which is sealingly mounted to a top of a housing, heating means arranged to heat the outer surface of the container for heating bread mix in the container, a paddle in the bottom of the container for connection to a mechanical drive that extends through a central aperture therein into the housing, and an electric motor arranged to be coupled to the mechanical drive for rotating the paddle, including lifting means for selectively raising a bread loaf to aid removal of a finished loaf of bread from the container.

2. A breadmaker according to claim 1, in which the heating means comprises an electric element surrounding the outside of the container in close proximity therewith.

3. A breadmaker according to claim 2, in which the heating element is mounted adjacent a top surface of the container.

4. A breadmaker according to claim 3, having a lid that closes over the top of the housing and has a lower surface formed or heat conducting material to receive and transmit heat in use from the heating element generally downwards into the container.

5. A breadmaker according to claim 1, in which the lifting means comprises an air jet arrangement provided in a lower surface of the container.

6. A breadmaker according to claim 1, in which the lifting means is arranged to be applied to the paddle.

7. A breadmaker according to claim 6, comprising a mechanical lever arrangement manually operable from externally of the housing and arranged to apply an upward force to the paddle.

8. A breadmaker according to claim 6, in which the paddle is coupled to the mechanical drive by a screw thread and lifting is achieved by driving the paddle in an opposite direction to its normal operating direction whereby unscrewing the paddle to cause the paddle to move upwards.

* * * * *